(12) United States Patent
Navon et al.

(10) Patent No.: US 9,088,694 B2
(45) Date of Patent: Jul. 21, 2015

(54) ADJUSTING VIDEO LAYOUT

(71) Applicant: AVAYA, INC., Basking Ridge, NJ (US)

(72) Inventors: Oren Navon, Ganey Tikva (IL); Itai E. Zilbershtein, Hod-Hasharon (IL); Yaniv Levy, Ramat Hasharon (IL)

(73) Assignee: AVAYA, INC., Basking Ridge, NJ (US)

( * ) Notice: Subject to any disclaimer, the term of this patent is extended or adjusted under 35 U.S.C. 154(b) by 127 days.

(21) Appl. No.: 14/045,616

(22) Filed: Oct. 3, 2013

(65) Prior Publication Data

US 2015/0097915 A1    Apr. 9, 2015

(51) Int. Cl.
*H04N 7/14* (2006.01)
*H04N 7/15* (2006.01)
*H04N 5/262* (2006.01)
*H04N 5/265* (2006.01)

(52) U.S. Cl.
CPC .................. *H04N 7/15* (2013.01); *H04N 5/265* (2013.01); *H04N 5/2628* (2013.01); *H04N 7/152* (2013.01)

(58) Field of Classification Search
CPC ................................ H04N 7/152; G06T 11/60
USPC .................................. 348/14.07, 14.08, 14.09
See application file for complete search history.

(56) References Cited

U.S. PATENT DOCUMENTS

| 8,139,100 B2* | 3/2012 | King et al. ................. 348/14.09 |
| 8,446,454 B2* | 5/2013 | Decker et al. ............... 348/14.09 |
| 2011/0007126 A1* | 1/2011 | Eshkoli ....................... 348/14.07 |
| 2011/0090302 A1* | 4/2011 | Leviav et al. ............. 348/14.09 |
| 2012/0050454 A1* | 3/2012 | Eisenberg et al. .......... 348/14.09 |
| 2013/0222529 A1* | 8/2013 | Decker et al. .......... 348/14.09 |
| 2014/0002585 A1* | 1/2014 | Leviav et al. .............. 348/14.08 |
| 2014/0354764 A1* | 12/2014 | Avni et al. .................. 348/14.07 |

* cited by examiner

*Primary Examiner* — Creighton Smith
(74) *Attorney, Agent, or Firm* — Cochran Freund & Young LLC

(57) ABSTRACT

Disclosed is a system and method for automatic scaling by a media conferencing unit (MCU) which is responsible for mixing a video stream sent by participant's to a video conference and composing unique layouts and video streams sent back to each participant for viewing.

12 Claims, 5 Drawing Sheets

ADJUSTING VIDEO LAYOUT

FIELD OF THE INVENTION

The field of the invention relates generally to communications conferencing and video layout.

BACKGROUND OF THE INVENTION

One of the popular options for multi-party video display is to display several participants concurrently in a display screen. This is generally referred to as a "Continuous Presence Layout" (CP). In a Continuous Presence Layout, a recipient will receive a video display in which other participants may appear in separate areas of a screen. These separate areas of the screen are often referred to as "view-ports". The number of view-ports available on a particular screen and the size of available view-ports may be determined by a variety of factors. These factors may include a participant viewer's preferences, such as in a 5-party call one participant may choose to see the other 4 parties on a large screen and another participant may choose to see only two of the other parties on a smaller screen. Different preferences will result in different arrangements for the layout of the screen. It is understood that a variety of factors may be utilized to determine different layouts and it is not limited to viewer preference.

SUMMARY

An embodiment of the invention may therefore comprise a method of providing a video layout for a video-conference, the video conference comprising a plurality of participants, the method comprising detecting a region of interest of one or more video feeds, determining a ratio between each region of interest and a full image area in each video feed, determining a relative size of each participant's face for a layout, and centering a resulting image so that the region of interest is centered An embodiment of the invention may further comprise a method of inducing endpoints to trim a camera's field of view during a multi-party conference, the method comprising detecting a screen size in use by each participant to the multi-party conference, signaling to each participant a preferred screen size for the multi-party conference, receiving media from each of the participants, and composing layouts and sending the layouts back to each participant in the multi-party conference.

An embodiment of the invention may further comprise a system for adjusting a video layout for a video conference, the system comprising a multi-conferencing unit, and a plurality of endpoints wherein each of the plurality of endpoints comprises a video camera producing a video feed and a monitoring means, wherein the multi-conferencing unit is enabled to detect a region of interest in each of the video feeds, determine a ration between each region of interest and a full image area in each video feed, determine a relative size of each participant's face for a layout, and center a resulting image so that the region of interest is centered.

DETAILED DESCRIPTION OF THE EMBODIMENTS

Multi-party video conferencing allows several participants to view live video of other participants engaged in the conference. Some embodiments may be illustrated below in conjunction with an exemplary video communication system. Although well suited for use with, e.g., a system using switch (es), server(s), and/or database(s), communications endpoints, etc., the embodiments are not limited to use with any particular type of video communication system or configuration of system elements. Videoconferencing is the conduct of a videoconference (also known as a video conference or video tele-conference) by a set of telecommunication technologies which allow two or more locations to communicate by simultaneous two-way video and audio transmissions.

One of the popular options for multi-party video display is to display several participants concurrently in a display screen. This is generally referred to as a "Continuous Presence Layout" (CP). In a Continuous Presence Layout, a recipient will receive a video display in which other participants may appear in separate areas of a screen. These separate areas of the screen are often referred to as "view-ports". The number of view-ports available on a particular screen and the size of available view-ports may be determined by a variety of factors. These factors may include a participant viewer's preferences, such as in a 5-party call one participant may choose to see the other 4 parties on a large screen and another participant may choose to see only two of the other parties on a smaller screen. Different preferences will result in different arrangements for the layout of the screen. It is understood that a variety of factors may be utilized to determine different layouts and it is not limited to viewer preference.

Figure 1:
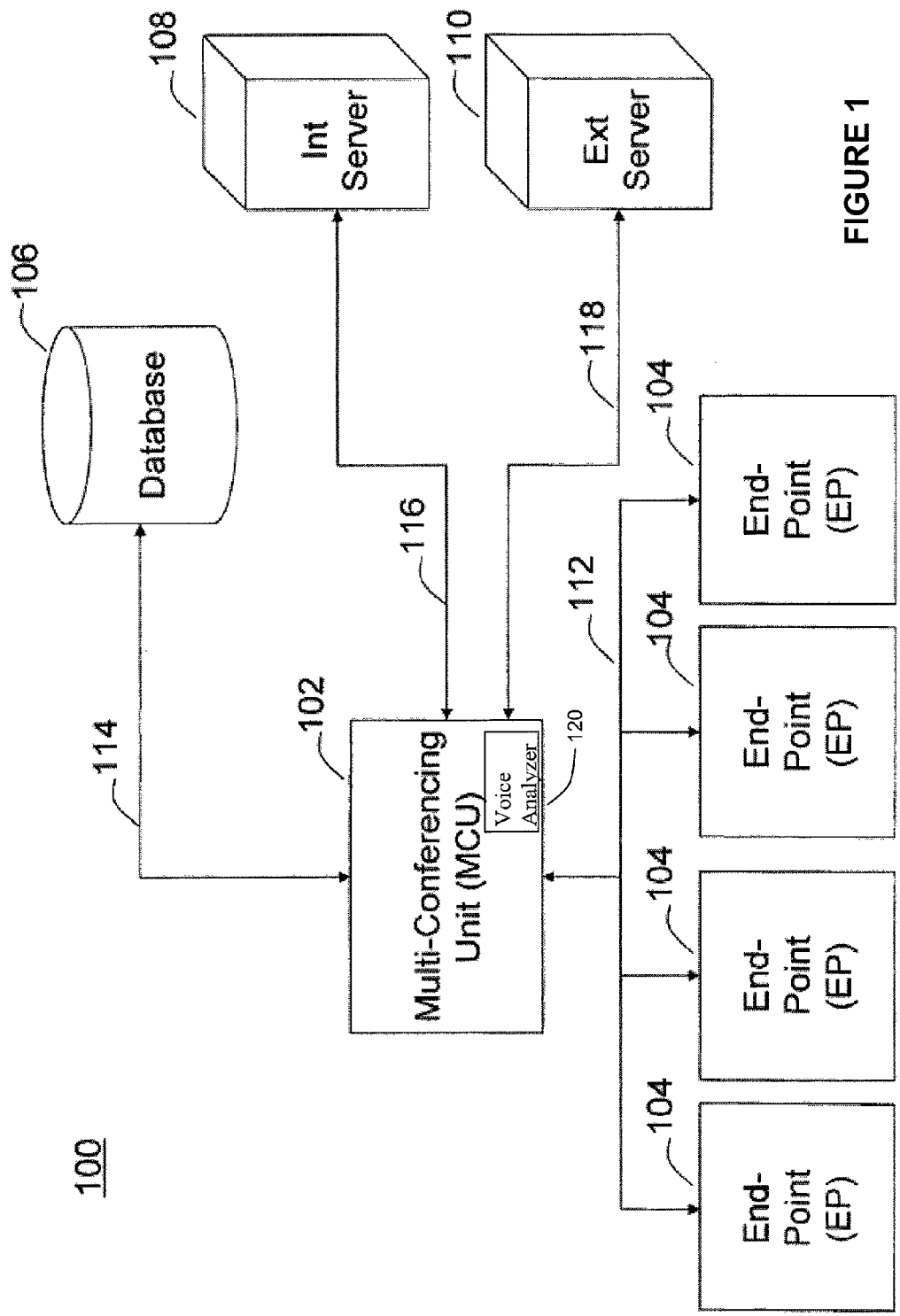
FIG. 1 shows a system for providing visual resources of video conference participants.

FIG. 1 shows a system for providing visual resources of video conference participants. The system 100 may comprise a multi-conferencing unit (MCU) 102, end points 104, a database 106, an internal server 108, an external server 110, and connections 112, 114, 116, and 118. The MCU 102 may comprise a voice analysis tool 120. The voice analysis tool may be a VAD, as discussed, or other voice analysis tool, as is understood by those skilled in the art. While the voice analysis tool 120 is shown in the MCU 102, it is understood that the voice analysis tool may be elsewhere in the system 100. For instance, the voice analysis tool, and an algorithm of the invention, may be particularly suited to perform its functions at an end point or communication client of the user. The voice analysis tool 120 is shown in FIG. 1 in the MCU for convenience purposes only and it is not intended to be restricted in where the algorithm may be performed. Further, it is understood that the algorithm, or voice analysis tool, may analyze a recorded sequence, which is part of a conference, to extract a representative image of a speaker.

Figure 2:
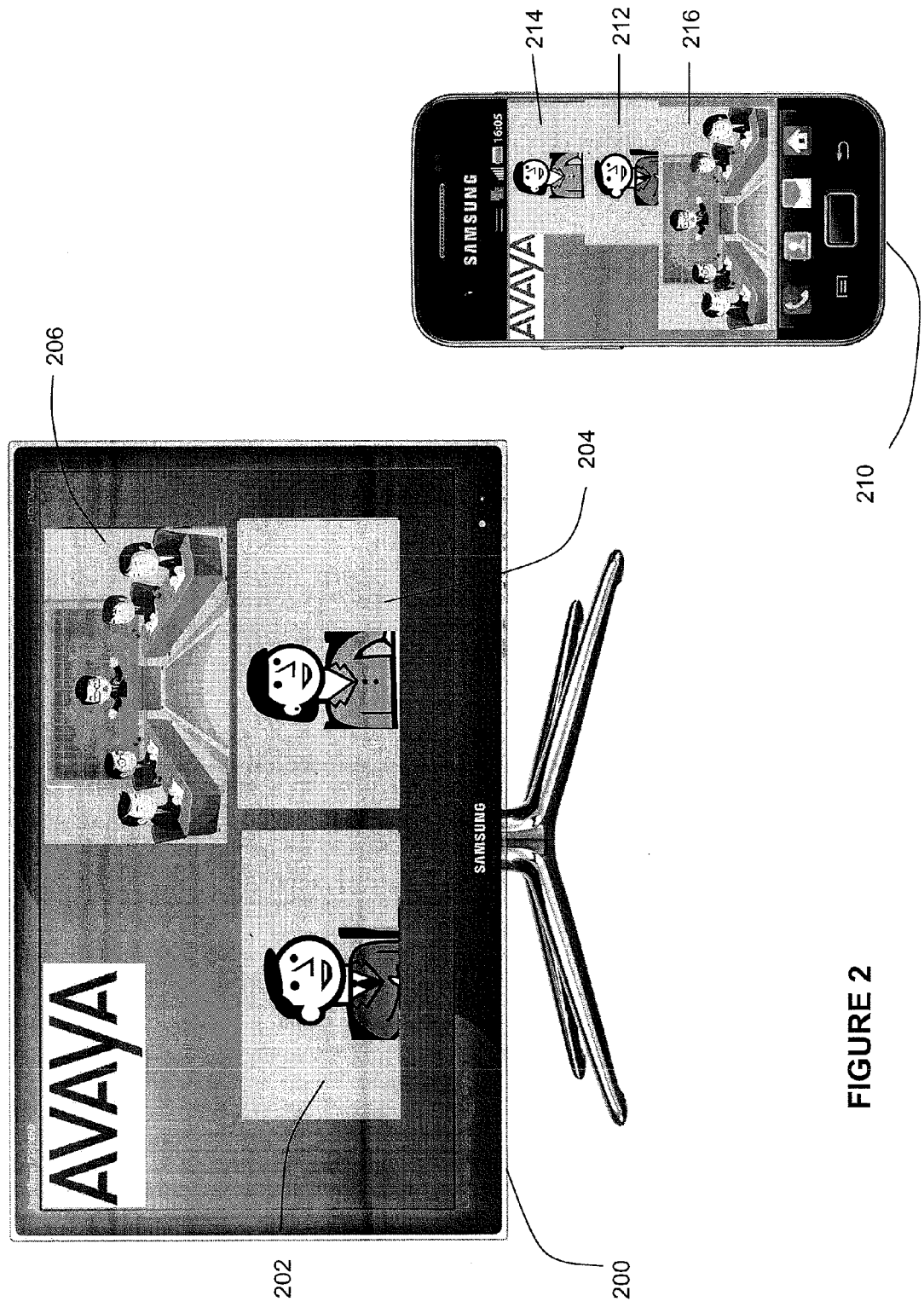
FIG. 2 shows an unadjusted video layout.

FIG. 2 shows an unadjusted video layout. A larger screen 200 layout is shown with three view-ports. A smaller screen 210 is shown with three view-ports. The three view-ports 202, 204, 206 of the larger screen 200 have the same perspective for the participants as the three view-ports 212, 214, 216 of the smaller screen 210. While the perspective might be acceptable and aesthetically normal for the large screen 200, the same perspective is unacceptable and aesthetically challenging for the small screen 210. In FIG. 2, it is understood that similar numerals represent video feeds from a particular participant. For instance, view-port 202 corresponds to the same video feed as view-port 212. This numeral system is also understood to apply to other figures throughout the application. It is also understood that throughout this discussion, a larger screen may refer to a 24 inch display, for example, and a smaller display may refer to a hand held type display, 5 inches for example.

Figure 3:
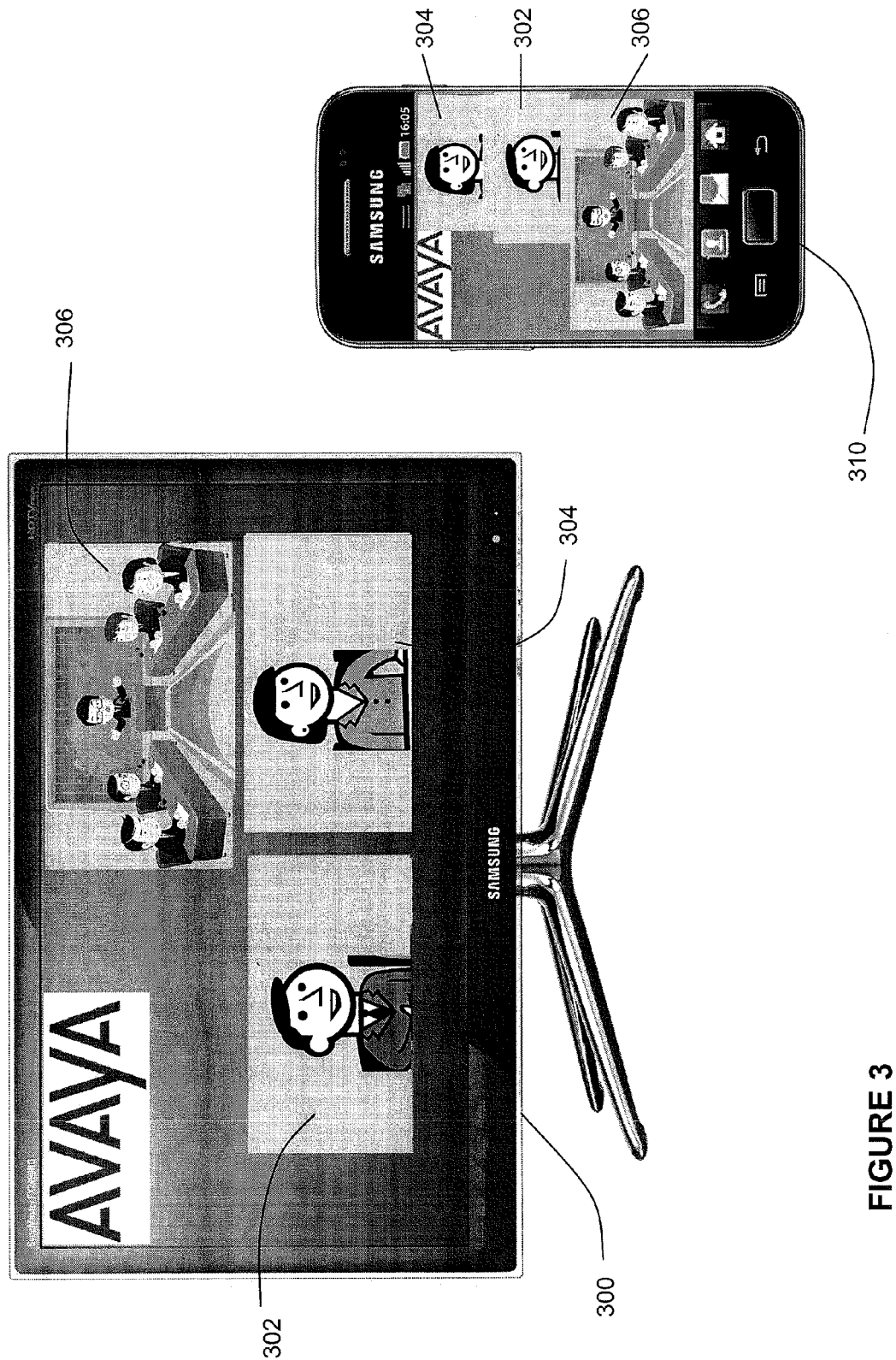
FIG. 3 shows an adjusted video layout.

FIG. 3 shows an adjusted video layout. A larger screen 300 layout is show with three view-ports. A smaller screen 310 is shown with three view-ports. The three view-ports 302, 304, 306 of the larger screen 300 have different perspectives for the participants as the three view-ports 312, 314, 316 of the smaller screen 310. For the smaller screen 310, the perspective is more acceptable and aesthetically pleasing and provides a similar viewer experience to that of the large screen 300. The faces of the individuals in two of the view-ports 302, 304 are more viewable and better suited to a smaller screen.

Figure 4:
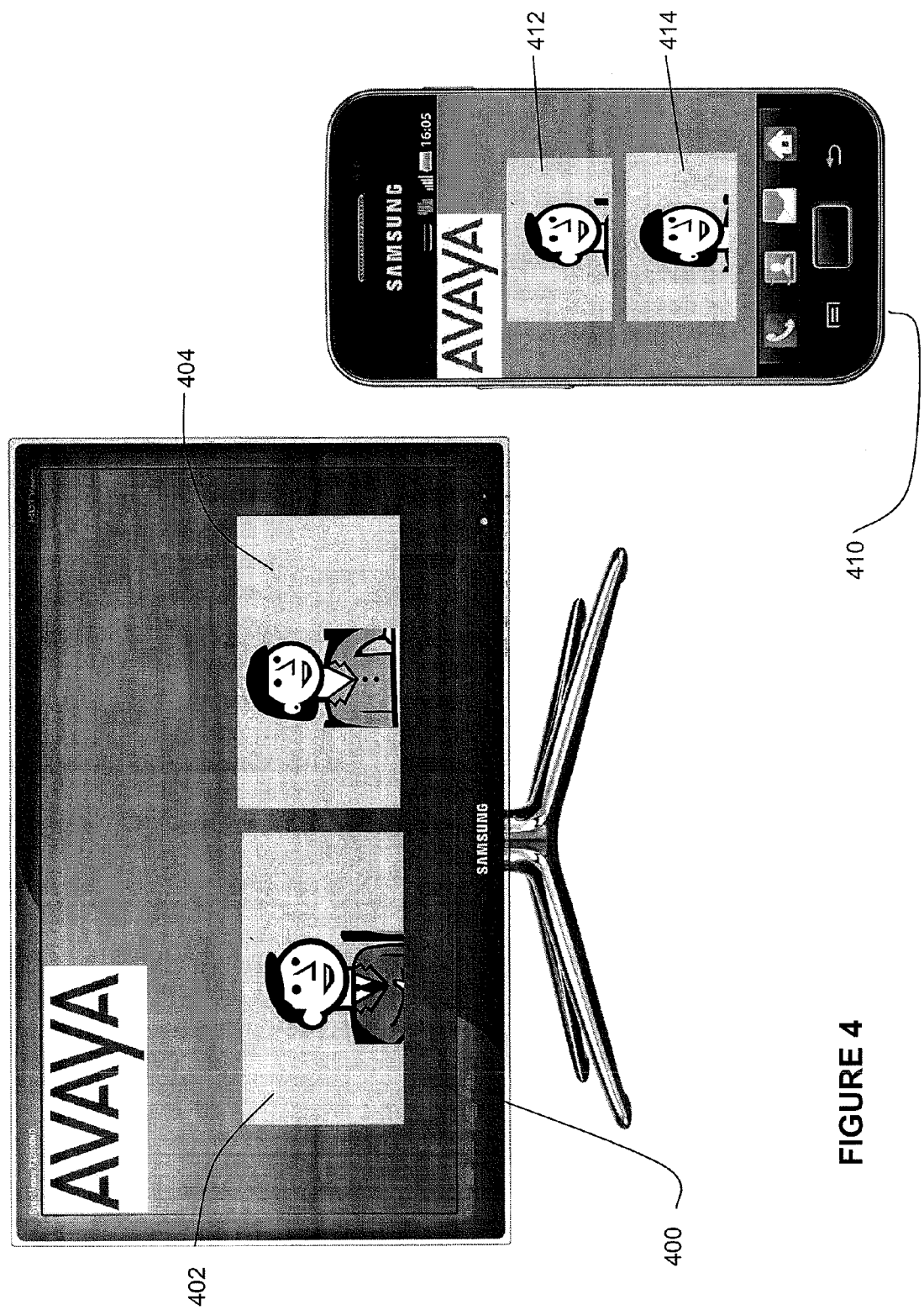
FIG. 4 shows a first adjusted video layout.

FIG. 4 shows a first adjusted video layout. The video layouts of FIG. 4 are in accordance with an embodiment of the invention. As shown, the larger screen 400 has a first 402 and second 404 view-port. There are also first 412 and second 414 view-ports of a smaller screen 410. The first 412 and second 414 view-ports of the smaller screen 410 are adjusted to provide a more acceptable and aesthetically pleasing viewer experience.

Figure 5:
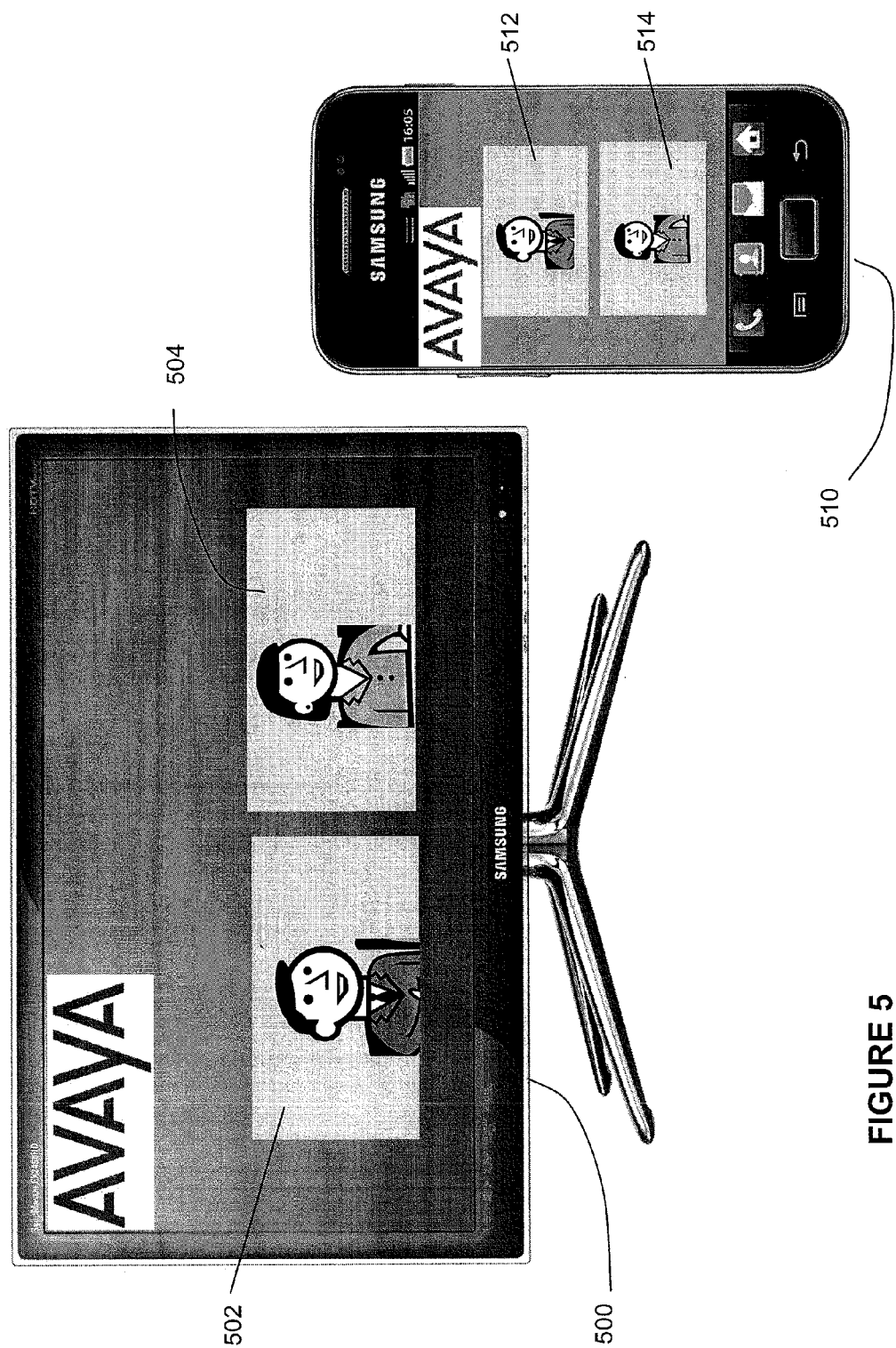
FIG. 5 shows a second adjusted video layout.

FIG. 5 shows a second adjusted video layout. The video layouts of FIG. 5 are in accordance with an embodiment of the invention. As show, the larger screen 500 has a first 502 and second 504 view-port. There are also first 512 and second 514 view-ports of a smaller screen 510. The first 512 and second 514 view-ports of the smaller screen 510 are adjusted to provide a more acceptable and aesthetically pleasing viewer experience.

Each view-port on a particular screen will present the live image captured by a video camera at a participant's end of the call. The camera at a particular location will capture the scene at the participant's end according to where it is pointed and according to the field of view (FOV) of its optical system. It is understood that the pointing and field of view are adjustable characteristics of most camera systems. Pan/tilt/zoom aspects of a camera may be adjusted either manually or automatically. For some participants, the camera and the physical situation of participants being videoed might result in a scene in which the face of the videoed participant completely fills the particular view-port". In other situations, the videoed participant's head and torso may take only a small part of the view-port. This may occur in situations where participant sits further away from the camera or if the field of view of the camera is large in context.

In the perspective of the participant viewing resulting videos in a number of view-ports, this may result in the Continuous Presence Layout showing faces and scenery in multiple scales. There may be a proportionally large amount of background scenery. This may occur then a participant's face fills but a small portion of the view port. The Continuous Presence Layout may show a participant's face with no background. This may occur when a participant's face fills an overly large portion of the view-port due to the associated camera having a relatively small field of view or the participant sitting relatively close to the camera.

It is understood that the pan/tilt/zoom settings of a camera may either be adjusted automatically through electro-mechanical means. However, it is also understood that many cameras may not be equipped for electro-(mechanical adjustment and may be without remote pan/tilt/zoom controls. Moreover, where there are a plurality of endpoints that may be attempting to view a particular video in particular view-port arrangements, a single field of view or movement by the videoed participant may prove acceptable for only one, or a few, but not all of the viewers. If multiple parties can remotely adjust the FOV of another party's camera, competing adjustments may result.

In an embodiment of the invention, a system and method is provided to implement automatic scaling by a media conferencing unit (MCU) which is responsible for mixing the video streams sent by participants. The MCU composes the video streams into unique layouts and video streams sent back to each participant for viewing.

In an embodiment, the image processing is performed at the MCU. For each incoming video feed from a participant, the MCU detects a "region of Interest" (ROI). The ROI may be the participant's face. It is understood that face detection algorithms may be used to detect a participant's face. The face detection algorithm may be performed by the MCU as it decodes the incoming video stream in preparation to encoding it as part f layouts to be sent to conference viewers. The face detection algorithm may be performed by a participant's camera and sent to the MCU as meta-data for the video stream.

The algorithm, whether performed by the MCU or the participant's camera, may utilize a ratio to obtain a desired output. For instance, "in_ratio(k)" (where k is a participant identifier) can be used to refer to the ratio between the ROI area and the full image area in participant k's input stream. For each particular layout (1) in which the particular participant is to be shown the MCU will perform various functions in furtherance of the algorithm. The MDU determines the relative size of the participant's face that is to be shown for each participant in that layout. This may be done by selecting a scale that is equal to the max "in-ration) for all participants that are to be seen in a layout 1. The MCU will then center the images sent by all participants so that the ROI is the center of the image. The MCU then crops the image to fit the desired relative size. If necessary, the MCU can scale up the cropped images to that they will fit the desired resolution for a view port. The MCU will encode the layouts as separate video streams and send them to the conference participants.

In an embodiment of the invention, the endpoints may be induced to trim the cameras' field-of-views to arrive at an alighted ROI size. For each in-coming video feed, the MCU detects the screen size in use by a participant through the signaling exchange with a participant's endpoint. The MCU signals to each participant the preferred screen size for the conference. This can induce an endpoint to change its cameras' field of view to allow for the other side's screen preference. For example, a conference with 3 parties may have the following associated screen sizes: Party-A a 5" display, Party-B a 24" display and Party-C a 24" display. The MCU may decide to signal to each participant the preferred screen size for the conference of 5". This would induce parties B and C to reduce their camera's field-of-view so that the images sent from the B and C cameras have more of the participants' head and torso in the frame. This essentially makes the video more suitable for viewing on party-A's smaller screen. This is similar to the steps of imaging of the video at the MCU described above. The MCU receives the media from all participants and composes layouts to send to the participants in the usual way for conference operation. Adjusting layouts according to a preference may require support of participating endpoints, but not significant processing burden is placed on the MCU.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of providing a video layout for a video-conference, said video conference comprising a plurality of participants, said method comprising:
    detecting a region of interest of one or more video feeds;
    determining a ratio between each region of interest and a full image area in each video feed;
    determining a relative size of each participant's face for a layout; and
    centering a resulting image so that the region of interest is centered.

2. The method of claim 1, further comprising cropping the resulting image to fit a desired relative size.

3. The method of claim 1, wherein the region of interest is a detected participant's face.

4. The method of claim 1, wherein the process of detecting a region of interest is performed by a multi-conferencing unit as said multi-conferencing unit decodes the video stream in preparation to encoding said video stream.

5. The method of claim 1, wherein the process of detecting a region of interest is performed by a video camera at an endpoint corresponding to one of said plurality of participants.

6. The method of claim 5, further comprising sending the detected region of interest to a multi-conferencing unit as meta-data for the video stream.

7. A method of inducing endpoints to trim a camera's field of view during a multi-party conference, said method comprising:
    detecting a screen size in use by each participant to said multi-party conference;
    signaling to each participant a preferred screen size for said multi-party conference;
    receiving media from each of said participants; and
    composing layouts and sending said layouts back to each participant in said multi-party conference.

8. The method of claim 7, wherein said processes of detecting and signaling is performed by a multi-conferencing unit.

9. The method of claim 7, wherein said process of detecting comprises detecting the screen size in use by the participant through a signaling exchange with a participant's endpoint.

10. A system for adjusting a video layout for a video conference, said system comprising:
    a multi-conferencing unit; and
    a plurality of endpoints wherein each of said plurality of endpoints comprises a video camera producing a video feed and a monitoring means;
    wherein said multi-conferencing unit is enabled to detect a region of interest in each of said video feeds, determine a ratio between each region of interest and a full image area in each video feed, determine a relative size of each participant's face for a layout, and center a resulting image so that the region of interest is centered.

11. The system of claim 10, wherein said multi-conferencing unit is further enabled to crop the resulting image to fit a desired relative size.

12. The system of claim 10, wherein the region of interest is a detected participant's face.

* * * * *